United States Patent [19]

Ohme et al.

[11] Patent Number: 6,060,579

[45] Date of Patent: May 9, 2000

[54] METHOD FOR PRODUCING POLYBUTYLENE TEREPHTHALATE

[75] Inventors: Hiroyuki Ohme, Nagoya; Motoki Hiratsuka, Aichi; Katsuo Nogami, Ehime, all of Japan

[73] Assignee: Toray Industries, Inc., Japan

[21] Appl. No.: 09/047,556

[22] Filed: Mar. 25, 1998

[30] Foreign Application Priority Data

Mar. 31, 1997 [JP] Japan ..................................... 9-080857
Mar. 31, 1997 [JP] Japan ..................................... 9-080858

[51] Int. Cl.$^7$ ..................................................... C08G 63/78
[52] U.S. Cl. ........................... 528/279; 528/283; 528/308; 528/308.6; 524/783; 524/784
[58] Field of Search ..................................... 528/279, 283, 528/308, 308.6; 524/783, 784

[56] References Cited

U.S. PATENT DOCUMENTS 3,936,421  2/1976  Hayashi et al. .
4,329,444  5/1982  Borman ................................... 528/272

FOREIGN PATENT DOCUMENTS 51-056898  5/1976  Japan .
2 184 129  6/1987  United Kingdom .

*Primary Examiner*—Samuel A. Acquah
*Attorney, Agent, or Firm*—Austin R. Miller

[57] ABSTRACT

A method for producing polybutylene terephthalate comprising continuously esterifying a dicarboxylic acid component consisting essentially of terephthalic acid with a diol component consisting essentially of 1,4-butanediol followed by polycondensing the resulting oligomer, wherein the esterification is effected in a molar ratio, P, of the diol component to the dicarboxylic acid component to fall between 1.1 and 1.6, in the presence of a combination of an organic titanium compound and an organic tin compound that satisfies the following requirement:

amount of organic titanium compound (mol %) $\leq 0.08 \times P - 0.07$ where P=molar ratio of diol component to dicarboxylic acid component, and is followed by the polycondensation.

13 Claims, No Drawings

METHOD FOR PRODUCING POLYBUTYLENE TEREPHTHALATE

BACKGROUND OF THE INVENTION

The present invention relates to a method for producing polybutylene terephthalate of high quality through continuous direct esterification followed by polycondensation with accompanied by little side reaction therethrough, and to polybutylene terephthalate with good stiffness.

Having good moldability, heat resistance, good mechanical properties and chemical resistance, polybutylene terephthalate (hereinafter referred to as PBT) is widely used as a material to be formed into electric parts and car parts. In addition, being soft and stretchable, PBT is also widely used as a material of fibers.

One method of producing such PBT, that is known is a direct polymerization method comprising an esterification step of esterifying terephthalic acid with 1,4-butanediol to give a PBT oligomer followed by a polycondensation step of further polymerizing the resulting PBT oligomer to a high degree of polymerization. In this direct polymerization method, the esterification step indispensably requires a catalyst. As the catalyst, organic titanium compounds are most popularly used. For example, Japanese Patent Application (JP-A) No. Sho-52-51495 discloses a continuous direct polymerization method for producing PBT, which uses a titanium catalyst.

However, though displaying excellent catalytic activity in esterification, organic titanium compounds (e.g., titanates) are problematic in that they are often hydrolyzed with ease by water that is produced during esterification and through decomposition (dehydrating cyclization) of 1,4-butanediol, thereby forming insoluble impurities and lowering their catalytic activity.

In order to solve this problem of insolubilization and inactivation of organic titanium compounds, various methods have heretofore been proposed, including, for example, a method of adding an organic titanium compound in two stages, or that is, adding it in both the former stage, in which the degree of esterification has reached 50%, and the latter stage (for example, JP-A Sho-49-57092); a method of using an organic titanium compound along with a polyhydric alcohol compound and an alkali metal compound (for example, JP-A Sho-62-225524); a method of using an alkanolamine titanate compound as the catalyst (for example, JP-A Sho-62-141022); a method of using an organic titanium compound along with an alkanolamine compound (for example, JP-A Sho-62-199617); and a method of adding a hindered phenol compound in the stage of esterification (for example, JP-A Hei-1-282215). In those methods, the catalytic activity of the catalysts being used could be improved in some degree.

However, though being effective in batch wise production of PBT oligomers, those methods are not so much effective in continuous production of PBT oligomers as producing insoluble impurities in large quantities. This may be because, in continuous production of PBT oligomers, organic titanium compounds will react not only with water but also with terephthalic acid in the reaction system to be inactivated while forming insoluble metal salts.

This problem of the formation of insoluble impurities and the reduction in the catalytic activity in the esterification stage shall naturally be a factor of interfering with the reduction in the reaction time, while inducing other various problematic matters such as the transparency of the reaction product is much lowered, that the intended degree of polymerization could not be obtained due to the reduction in the polymerization reactivity, that the moldability of the polymer product is lowered due to the insoluble impurities inevitably existing in the polymer, and even that the quality, especially the toughness of the shaped articles of the polymer is lowered.

Except for organic titanium compounds, Japanese Patent Publication (JP-B) No. Sho-53-9796 discloses organic tin compounds which are said to be effective. However, the disclosed organic tin compounds are problematic in that the continuous esterification using them is dull while the amount of the side product formed is increased, and that, if an increased amount of the catalyst is added in order to promote the reaction, the polymer product, PBT is discolored and its heat resistance is lowered.

JP-A Sho-62-195017 discloses continuous direct polymerization of 1,4-butanediol and terephthalic acid in a molar ratio, the former to the latter, of not smaller than 2, in which is used a titanium or tin catalyst.

However, continuous esterification in a high molar ratio is problematic in that side reaction and introduction of ether bonds into the molecular chain being formed easily to occur. Therefore, it is desirable that the molar ratio is as small as possible, but in the disclosed continuous direct esterification, it is difficult to reduce the molar ratio.

SUMMARY OF THE INVENTION

The present invention is to provide a method for producing PBT of high quality through continuous direct esterification followed by polycondensation with accompanied by little side reaction therethrough, and to provide PBT having a much improved quality.

Specifically, the method for producing PBT of the invention comprises continuous esterification of a dicarboxylic acid component consisting essentially of terephthalic acid with a diol component consisting essentially of 1,4-butanediol followed by polycondensation of the resulting oligomer, and is characterized in that the esterification is effected in a molar ratio, P, of the diol component to the dicarboxylic acid component to fall between 1.1 and 1.6, in the presence of a combination of an organic titanium compound and an organic tin compound that satisfies the following requirement:

$$\text{amount of organic titanium compound (mol \%)} \leq 0.05 \times P - 0.07$$

wherein P=molar ratio of diol component to dicarboxylic acid component, and is followed by the polycondensation; or the method comprising continuous esterification of a dicarboxylic acid component consisting essentially of terephthalic acid with a diol component consisting essentially of 1,4-butanediol followed by polycondensation of the resulting oligomer to produce PBT is characterized in that the esterification is first effected in a molar ratio, P, of the diol component to the dicarboxylic acid component to fall between 1.1 and 1.6, in the presence of an organic tin compound but substantially in the absence of any organic titanium compound, to a degree of esterification of not lower than 80% in the first stage of the esterification, and then from 0.005 to 0.3 parts by weight, relative to 100 parts by weight of polybutylene terephthalate to be produced, of an organic titanium compound is added to the reaction system in the second stage of the esterification, which is then followed by the polycondensation.

As the organic titanium compound to be used, preferred is tetrabutoxy titanium; and as the organic tin compound, preferred are monoalkyl tin compounds and/or alkylstannic acids. The organic tin compound to be added is preferably from 0.02 to 0.15 parts by weight relative to 100 parts by weight of PBT to be produced. Also preferably, the esterification is effected at a temperature falling between 200 and 240° C. and under a reduced pressure falling between 100 and 600 mmHg.

PBT of the invention is characterized in that its crystallization temperature in cooling falls between 170 and 180° C. and its solution haze is not larger than 20%, and that, when it is molded into shaped articles through injection molding, the spherical grains constituting the articles have a mean radius of not larger than 4 μm. More preferably, PBT is produced according to the method as claimed in any one of claims 1 to 9. The invention further provides shaped PBT articles as formed from PBT defined herein.

DETAILED DESCRIPTION OF THE PREFERRED EMBODIMENTS

Now, the invention is described in detail hereinunder.

Polybutylene terephthalate (PBT) as referred to herein indicates a high-molecular, thermoplastic polyester as formed from a dicarboxylic acid consisting essentially of terephthalic acid and a glycol component consisting essentially of 1,4-butanediol and having ester bonds in its backbone chain. The acid component may contain other comonomers of isophthalic acid, orthophthalic acid, naphthalenedicarboxylic acid, oxalic acid, adipic acid, 1,4-cyclohexanedicarboxylic acid, etc.; and the glycol component may contain other comonomers of ethylene glycol, propylene glycol, 1,6-hexanediol, 1,4-cyclohexane-dimethanol, bisphenol A, polyethylene glycol, polypropylene glycol, polytetramethylene glycol, etc. Preferably, the amount of these comonomers is not larger than 40 mol % relative to terephthalic acid and to 1,4-butanediol.

The ratio of the glycol component to the acid component is preferably between 1.1 and 1.6 in order to depress the side reaction of cyclizing 1,4-butanediol to give tetrahydrofuran (hereinafter referred to as THF).

The organic titanium compound for use in the invention typically includes titanates and their condensates to be represented by:

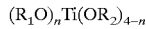

wherein $R_1$ and $R_2$ each represent an aliphatic, alicyclic or aromatic hydrocarbon having from 1 to 10 carbon atoms; and n indicates a number of from 0 to 4 (including decimals).

Specifically, this includes methyl, tetra-n-propyl, tetra-n-butyl, tetra-isopropyl, tetra-isobutyl, tetra-tert-butyl, cyclohexyl, phenyl, benzyl and tolyl esters, and even their mixed esters of titanic acid. Of those, preferred are tetra-n-propyl, tetra-n-butyl and tetra-isopropyl titanates. One or more these organic titanium compounds can be used either singly or as combined.

The organic tin compound for use in the invention may be typically represented by:

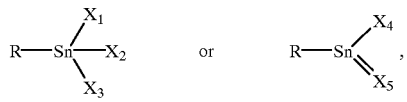

wherein R represents an alkyl group, or an aryl group; $X_1$ to $X_4$ each represent a monovalent group including an alkyl group, an aryl group, an allyloxy group, a cyclohexyl group, a hydroxyl group, a halogen atom and the like, and these may be the same or different; and $X_5$ represents a sulfur or oxygen atom.

As specific examples of the compound, mentioned are dibutyl tin oxide, methylphenyl tin oxide, tetraethyl tin, hexaethyl ditin oxide, cyclohexahexyl ditin oxide, didodecyl tin oxide, triethyl tin hydroxide, triphenyl tin hydroxide, triisooctyl tin acetate, dibutyl tin diacetate, diphenyl tin dilaurate, monobutyl tin trichloride, dibutyl tin dichloride, tributyl tin chloride, dibutyl tin sulfide, butylhydroxy tin oxide, etc. Of those, preferred are monoalkyl tin compounds.

As other examples of the organic tin compound usable herein, mentioned are stannoxanes. Preferred are alkylstannic acids, such as methylstannic acid, ethylstannic acid, butylstannic acid, etc.

One or more these organic tin compounds are used herein either singly or combined.

The amount of the organic tin compound to be added is preferably from 0.02 to 0.15 parts by weight, more preferably from 0.03 to 0.1 parts by weight, relative to 100 parts by weight of PBT to be produced.

Where both the organic titanium catalyst and the organic tin catalyst are added to the reaction system all at a time in the initial stage of the reaction, the amount of the organic titanium compound to be added shall satisfy the following requirement relative to the amount of the dicarboxylic acid component to be reacted, in order to attain the object of the invention:

$$\text{amount of organic titanium compound (mol \%)} \leq 0.08 \times P - 0.07$$

wherein P=molar ratio of diol component to dicarboxylic acid component. If the amount of the organic titanium compound added is larger than the defined range, the amount of impurities formed in the polymer greatly increases so that the object of the invention could not be attained. It is desirable that the amount of the organic titanium compound added is not smaller than 0.01 mol % relative to the dicarboxylic acid component to be reacted.

The object of the invention can also be attained by two-stage esterification in which the esterification in the first stage is effected in the presence of an organic tin compound but substantially in the absence of any organic titanium compound to a degree of esterification of not lower than 80%, and is followed by the esterification in the second stage to be effected in the presence of an organic titanium compound added after the first stage of esterification.

In this case, all the necessary amount of the organic tin compound is preferably added to the reaction system at the initial stage of the first-stage esterification, but a part of it may be added thereto at the initial stage and the remaining part thereof is added in the course of the first-stage esterification. The first-stage esterification must be continued substantially in the absence of any organic titanium compound until the degree of esterification reaches 80% or more. In the next second stage of esterification, an organic titanium compound is added, and its amount is from 0.005 to 0.3 parts by weight, preferably from 0.01 to 0.1 parts by weight, relative to 100 parts by weight of PBT to be produced.

The continuous esterification device to be used in carrying out the invention is not specifically defined, but preferred is a completely-mixing type, esterification reactor.

It is desirable that the esterification is effected at a reaction temperature falling between 180 and 250° C. preferably between 200 and 240° C., and under a pressure of not higher than 760 mmHg, preferably under a reduced pressure falling between 100 and 600 mmHg. (1 mmHg=$1.33322 \times 10^2$ Pa) In order to obtain PBT having better crystalline characteristics, it is preferable that the esterification is effected at a reaction temperature falling between 200 and 240° C. and under a reduced pressure falling between 100 and 600 mmHg. It is also desirable that the degree of reaction to give the PBT oligomer is not lower than 97% after the entire esterification.

In the embodiment where the first stage of esterification is effected substantially in the absence of any organic titanium compound, it is desirable that the first-stage esterification is effected at a reaction temperature falling between 180 and 240° C., preferably between 200 and 230° C., and under a pressure of not higher than 760 mmHg, preferably under a reduced pressure falling between 100 and 600 mmHg, until the degree of reaction reaches 80% or more. (1 mmHg=$1.33322 \times 10^2$ Pa) In this, it is also desirable that the second-stage esterification is effected at a reaction temperature falling between 190 and 250 ° C., preferably between 200 and 240 ° C., and under a pressure of not higher than 760 mmHg, preferably under a reduced pressure falling between 100 and 550 mmHg. Preferably, the degree of esterification after the second-stage esterification reaches 97% or more.

The PBT oligomer thus formed in the continuous esterification is then subjected to polycondensation, which is not specifically defined. Any ordinary, either batchwise or continuous polymerization conditions that are generally employable in ordinary production of PBT shall directly apply to the step of polycondensation. For example, the reaction temperature preferably falls between 230 and 260° C., more preferably between 240 and 255° C.

Where PBT is produced according to the method of the invention, one or more ordinary additives, including, for example, ultraviolet absorbents, thermal stabilizers, lubricants, mold releasing agents, dyes, pigments and other colorants, may be added thereto within the range not interfering with the object of the invention. Preferred is the addition thereto of phosphorus compounds, such as phosphoric acid, phosphorous acid, hypophosphorous acid, pyrophosphoric acid, phosphoric acid triamide, monoammonium phosphate, trimethyl phosphate, dimethyl phosphate, diphenyl phosphate, triphenyl phosphate, diphenyl phosphate, triphenyl phosphate, dimethylphenyl phosphonate, etc., as noticeably improving the color of the polymer.

PBT as produced according to the method of the invention has better resinous stiffness than that produced in any other conventional methods. Specifically, PBT produced in the invention has a crystallization temperature in cooling of from 170 to 180° C., when measured with a differential scanning calorimeter (DSC), and its solution haze is not higher than 20%, preferably not higher than 15%. Conventional PBT may have these values, however, PBT of the invention is superior to conventional PBT in that, when it is molded into shaped articles through injection molding, the spherical grains constituting the articles have a mean radius of not larger than 4 μm, which is smaller than that of the spherical grains constituting the articles formed from conventional PBT.

The articles composed of spherical grains having such a small mean radius are good as having high toughness, especially high toughness while stored hot for a long period of time, unlike conventional ones. Articles composed of small-sized spherical grains may be obtained if a nucleating agent is added thereto. However, the addition of a nucleating agent is problematic in that it lowers the stiffness of the articles and worsens the other properties thereof while the articles are stored long. PBT produced in the invention is out of those problems, and is favorably used in various car parts, and electric and electronic parts.

The physical data of PBT as referred to herein are measured according to the methods mentioned below.
Crystallization Temperature in Cooling A sample polymer is melted at 250° C. and then cooled at a rate of 20° C. /min, whereupon the crystallization temperature (Tc) in cooling of the sample is measured with a differential scanning calorimeter (DSC).
Solution Haze 5.4 g of a sample polymer is dissolved under heat in 40 ml of a mixed solvent of phenol/tetrachloroethane (60/40, wt. %), and the resulting solution is put into a 30 mm cell, through which the haze of the solution is measured with an integrating haze meter (manufactured by Nippon Seimitsu Kogaku KK). A polymer having a larger value measured contains a larger amount of impurities.
Mean Radius of Spherical Grains Constituting Articles Formed Through Injection Molding Using a screw-type injection-molding machine, a sample polymer is molded into ASTM No. 1 dumbbell-shaped test pieces. The cylinder temperature is 250° C., the mold temperature is 40° C., and the molding cycle is 25 seconds. 8 samples are sampled out of one and the same test piece and photographed under an electronic microscope. In the microscopic pictures, the mean grain size of the spherical grains constituting the test piece is obtained.

EXAMPLES

Now, the invention is described concretely with reference to the following Examples.

The degree of reaction to give the oligomer in each Example was obtained according to the following equation based on the acid value and the saponification value of the reaction product.

Degree of Reaction={(saponification value–acid value)/saponification value}×100(%)

Acid Value

The reaction product is dissolved in a solvent of o-cresol/chloroform, and is titered with ethanolic potassium hydroxide to obtain its acid value.
Saponification Value The reaction product is hydrolyzed with an alkali, and is back-titrated with an acid to obtain its saponification value.

The amount of the side product, tetrahydrofuran (THF) was determined through gas chromatography.

Examples 1 to 3

Into a completely-mixing type, first esterification reactor as previously charged with PBT oligomer having a degree of reaction of 90%, continuously fed was a slurry of terephthalic acid and 1,4-butanediol in a molar ratio, P, of 1,4-butanediol to terephthalic acid as in Table 1. Butylhydroxy tin oxide and tetrabutoxy titanate were added thereto both at a time, the amount of the former, in terms of % by weight relative to the polymer, PBT to be produced, being as in Table 1, while that of the latter, in terms of % by weight relative to the polymer, PBT to be produced and in terms of % by mol relative to terephthalic acid added, being as in Table 1.

The first esterification reactor was kept at a temperature of 220° C. and under a pressure of 500 mmHg. However, when the molar ratio was 1.4, the pressure was kept at 400 mmHg, and when the molar ratio was 1.2, it was kept at 300 mmHg. The PBT oligomer in the first esterification reactor was continuously taken out, and then fed into a completely-mixing type, second esterification reactor as previously charged with PBT oligomer having a degree of reaction of 98%.

The second esterification reactor was kept at a reaction temperature of 230° C. and under a pressure of 300 mmHg. However, when the molar ratio was 1.2, the pressure was controlled at 200 mmHg. The PBT oligomer in the second esterification reactor was continuously taken out, and ground into flakes.

The slurry feeding rate and the oligomer taking-out rate were so controlled that the residence time in the first esterification reactor might be 240 minutes while that in the second esterification reactor be 60 minutes. After 18 hours in which the reaction reached the steady state, the oligomer distillate was sampled for 6 hours, and the degree of reaction of the sample and the amount of the side product, tetrahydrofuran in the sample were measured.

To the oligomer as taken out of the second esterification reactor, added was 0.03% by weight, relative to the polymer to be produced, of tetrabutoxy titanate, and the oligomer was subjected to batch-wise polycondensation at 250° C. and under a reduced pressure of not higher than 1 mmHg, for 3 hours to obtain PBT polymer. The solution haze of the thus-obtained PBT polymer was measured. The data are shown in Table 1.

Comparative Examples 1 to 3

The same process as in Example 1 was repeated, except that the amount of tetrabutoxy titanate added in the esterification step was varied as in Table 1. The data obtained herein are shown in Table 1.

Comparative Example 4 and 5

The same process as in Example 1 was repeated, except that the molar ratio, P, of 1,4-butanediol to terephthalic acid and the amounts of butylhydroxy tin oxide and tetrabutoxy titanate added were varied as in Table 1. In Comparative Example 4, the first esterification reactor was kept at 210° C. and the residence time therein was 120 minutes. The data obtained herein are shown in Table 1.

TABLE 1

|  | Example | | | Comparative Example | | | | |
| --- | --- | --- | --- | --- | --- | --- | --- | --- |
|  | 1 | 2 | 3 | 1 | 2 | 3 | 4 | 5 |
| Molar Ratio | 1.2 | 1.4 | 1.6 | 1.2 | 1.4 | 1.6 | 2.5 | 1.2 |
| Amount of Titanium Added, wt. % relative to PBT | 0.038 | 0.061 | 0.088 | 0.045 | 0.07 | 0.09 | 0.09 | 0 |
| Amount of Titanium Added, mol % relative to terephthalic acid | 0.025 | 0.04 | 0.057 | 0.029 | 0.045 | 0.058 | 0.058 | 0 |
| Amount of Tin Added, wt. % | 0.05 | 0.04 | 0.03 | 0.05 | 0.04 | 0.03 | 0.03 | 0.08 |
| Degree of Reaction, % | 97.5 | 98.1 | 98.9 | 97 | 97.3 | 98.5 | 99.3 | 95.8 |
| Amount of Side Product, THF, g/kg polymer | 27 | 35 | 47 | 33 | 41 | 52 | 103 | 38 |
| Solution Haze, % | 11 | 8 | 5 | 37 | 23 | 11 | 5 | 54 |

The crystallization temperature in cooling (Tc) and the intrinsic viscosity of the polymers obtained in Examples 1 to 3 and Comparative Examples 1 to 5 were measured. To determine its intrinsic viscosity, each polymer sample was dissolved in p-chlorophenol, and its viscosity at 25° C. was measured.

Using a screw-type injection-molding machine, each polymer was molded into ASTM No. 1 dumbbell-shaped test pieces. The cylinder temperature was 250° C., the mold temperature was 40° C., and the molding cycle was 25 seconds. In the electronic microscopic pictures, the mean grain size of the spherical grains constituting the test pieces of the molded article was obtained. In accordance with ASTM D638, the tensile yield strength and the tensile breaking elongation of those test pieces were measured. The test pieces were subjected to dry heat treatment in a hot air oven at 150° C. for 100 hours, and to wet heat treatment in a thermo-hygrostat at 80° C. and 95% RH for 500 hours, and their tensile yield strength and tensile breaking elongation were also measured in the same manner as above.

PBT as produced in conventional esterification followed by batch-wise polycondensation (Toray's Toraycon, having a solution haze of 8%) (Comparative Example 6) was also tested and evaluated in the same manner as above. The data are shown in Table 2.

TABLE 2

|  |  | Example | | | Comparative Example | | | | | |
|---|---|---|---|---|---|---|---|---|---|---|
|  |  | 1 | 2 | 3 | 1 | 2 | 3 | 4 | 5 | 6 |
| Tc, ° C. | | 176 | 175 | 173 | 177 | 175 | 175 | 169 | 175 | 176 |
| Intrinsic Viscosity | | 0.92 | 0.92 | 0.91 | 0.93 | 0.92 | 0.94 | 0.91 | 0.91 | 0.90 |
| Tensile Yield Strength (MPa) | just after molded | 54 | 54 | 53 | 55 | 54 | 53 | 52 | 55 | 54 |
|  | after dry heat treatment | 59 | 57 | 56 | 60 | 59 | 57 | 56 | 61 | 57 |
|  | after wet heat treatment | 56 | 56 | 55 | 57 | 57 | 55 | 54 | 58 | 56 |
| Tensile Breaking Elongation (%) | lust after molded | 70 | 83 | 85 | 55 | 42 | 24 | 95 | 18 | 65 |
|  | after dry heat treatment | 30 | 35 | 43 | 9 | 12 | 14 | 21 | 8 | 20 |
|  | after wet heat treatment | 45 | 53 | 62 | 15 | 17 | 20 | 51 | 14 | 33 |
| Mean Radius of Spherical Grains, μm | | 2.1 | 2.6 | 3.6 | 3.5 | 4.3 | 5.5 | 12 | 4.9 | 5.5 |

As is obvious from the results noted above, the PBT polymers produced according to the method of the invention had a small value of solution haze and contained a significantly reduced amount of impurities resulting from the catalyst compounds used. In addition, there formed a small amount of the side product, THF as produced during esterification, and their crystallization temperature was high. Moreover, the mean radius of the spherical grains constituting the articles formed from them was small, and the toughness of the articles was high.

As opposed to these, the polymers of Comparative Examples 1 to 3 in which the amount of the titanium catalyst added in the esterification step was too large had a large value of solution haze and contained a large amount of impurities, and their toughness was low. The polymer of Comparative Example 4 in which the molar ratio, P, of 1,4-butanediol to terephthalic acid was larger than the range defined herein formed a large amount of the side product, THF produced during esterification, and the spherical grains constituting the articles formed from the polymer had a large mean radius. The toughness, especially that after dry heat treatment and after wet heat treatment of the articles of the polymer of Comparative Example 4 was low. The polymer of Comparative Example 5 in which no titanium catalyst was used in the esterification step had a large value of solution haze, as the esterification was insufficient. In addition, its toughness was low. The conventional PBT of Comparative Example 6 as produced in conventional esterification followed by batch wise polycondensation with that the spherical grains constituting the articles formed from it had a large mean radius, was inferior to the polymer of the invention in that the toughness, especially that after dry heat treatment and after wet heat treatment of the articles was low.

Example 4

Into a first esterification reactor as previously charged with PBT oligomer having a degree of reaction of 90%, continuously fed was a slurry of terephthalic acid and 1,4-butanediol in a molar ratio, P, of 1,4-butanediol to terephthalic acid of 1.4. Simultaneously with this, 0.04 parts by weight, relative to 100 parts by weight of PBT to be produced, of butylhydroxy tin oxide was continuously fed into the reactor. The reaction temperature in the reactor was controlled to be 220° C., and the pressure therein was 300 mmHg.

The PBT oligomer was continuously taken out of the first esterification reactor, and then fed into a second esterification reactor as previously charged with PBT oligomer having a degree of reaction of 98%. The second esterification reactor was kept at a reaction temperature of 230° C. and under a pressure of 200 mmHg, into which was fed 0.08 parts by weight, relative to 100 parts by weight of PBT to be produced, of tetrabutoxy titanate. The PBT oligomer in the second esterification reactor was continuously taken out, and ground into flakes.

The slurry feeding rate and the oligomer taking-out rate were so controlled that the residence time in the first esterification reactor might be 120 minutes while that in the second esterification reactor be 90 minutes.

After 8 hours in which the reaction reached the steady state, the PBT oligomer distillate was sampled for 6 hours, and the degree of reaction of the sample and the amount of the side product, THF were measured. The degree of reaction in the first esterification reactor was 85%, that in the second esterification reactor was 99%, and the amount of the side product, THF was 25 g per kg of the oligomer formed.

To the oligomer as taken out of the second esterification reactor, added was 0.03% by weight, relative to the polymer to be produced, of tetrabutoxy titanate, and the oligomer was subjected to batch-wise polycondensation at 250° C. and under a reduced pressure of not higher than 1 mmHg, for 3 hours to obtain PBT polymer. The solution haze of the thus-obtained PBT polymer was measured to be 6%

Comparative Example 7

The same process of continuous esterification followed by polycondensation as in Example 4 was repeated, except that 0.03 parts by weight, relative to PBT to be produced, of tetrabutoxy titanate was fed into the first esterification reactor in place of butylhydroxy tin oxide. In this, the degree of reaction in the first esterification reactor was 88%, that in the second esterification reactor was 97%, the amount of the side product, THF was 35 g per kg of the oligomer formed, and the polymer solution haze was high to be 53%.

Comparative Example 8

The same process of continuous esterification followed by polycondensation as in Example 4 was repeated, except that tetrabutoxy titanate was fed into the first esterification reactor along with butylhydroxy tin oxide, but not into the second esterification reactor. In this, the degree of reaction in the first esterification reactor was 79%, that in the second esterification reactor was 98%, the amount of the side product, THF was 33 g per kg of the oligomer formed, and the polymer solution haze was high to be 28%.

Comparative Example 9

The same process of continuous esterification followed by polycondensation as in Example 4 was repeated, except that the amount of butylhydroxy tin oxide fed into the first esterification reactor was 0.20 parts by weight relative to PBT to be produced, and that tetrabutoxy titanate was not fed into the second esterification reactor. In this, the degree of reaction in the first esterification reactor was 85%, that in the second esterification reactor was 96%, the amount of the side product, THF was 32 g per kg of the oligomer formed, and the polymer solution haze was 25%.

Comparative Example 10

The same process of continuous esterification followed by polycondensation as in Example 4 was repeated, except that the residence time in the first esterification reactor was controlled to be 90 minutes and that in the second esterification reactor was 120 minutes. In this, the degree of reaction in the first esterification reactor was low to be 75%, that in the second esterification reactor was 96%, the amount of the side product, THF was 40 g per kg of the oligomer formed, and the polymer solution haze was high to be 23%.

What is claimed is:

1. A method for producing polybutylene terephthalate comprising:

(A) continuously esterifying a dicarboxylic acid component consisting essentially of terephthalic acid with a diol component consisting essentially of 1,4-butanediol, wherein the esterification is effected in a molar ratio of the diol component to the dicarboxylic acid component to fall between 1.1 and 1.6, in the presence of a combination of an organic titanium compound and an organic tin compound that satisfies the following requirement:

amount of organic titanium compound (mol %)$\leq 0.08 \times P - 0.07$ where P=molar ratio of diol component to dicarboxylic acid component, resulting in an oligomer; and (B) continuous polycondensation of said oligomer.

2. A method for producing polybutylene terephthalate comprising:

(A) continuously esterifying a dicarboxylic acid consisting essentially of terephthalic acid, with a diol component consisting essentially of 1,4-butanediol, wherein a first esterification is effected in a molar ratio of the diol component to the dicarboxylic acid component to fall between 1.1 and 1.6, in the presence of an organic tin compound but substantially in the absence of any organic titanium compound, to a degree of esterification of not lower than 80% in said first esterification, and then adding from 0.005 to 0.3 parts by weight, relative to 100 parts by weight of polybutylene terephthalate to be produced, an organic titanium compound to the reaction system forming a second esterification; and (B) effecting a continuous polycondensation.

3. The method for producing polybutylene terephthalate as claimed in claim 1 or 2, wherein the organic titanium compound is tetrabutoxy titanium.

4. The method for producing polybutylene terephthalate as claimed in claim 1 or 2, wherein the organic tin compound is selected from the group consisting of monoalkyl tin compounds and alkylstannic acids.

5. The method for producing polybutylene terephthalate as claimed in claim 1 or 2, wherein the amount of the organic tin compound added is from 0.02 to 0.15 parts by weight relative to 100 parts by weight of polybutylene terephthalate to be produced.

6. The method for producing polybutylene terephthalate as claimed in claim 1 or 2, wherein the esterification is effected at a temperature falling between 180 and 250° C. and under a reduced pressure not higher than 760 mmHg.

7. The method for producing polybutylene terephthalate as claimed in claim 6, wherein the esterification is effected at a temperature falling between 200 and 240° C. and under a reduced pressure falling between 100 and 600 mmHg.

8. The method for producing polybutylene terephthalate as claimed in claim 2, wherein the first stage of esterification is effected at a temperature falling between 180 and 240° C. and under a pressure not higher than 760 mmHg, and the second stage of esterification is effected at a temperature falling between 190 and 250° C. and under a pressure not higher than 760 mmHg.

9. The method for producing polybutylene terephthalate as claimed in claim 8, wherein the first stage of esterification is effected at a temperature falling between 200 and 230° C. and under a pressure falling between 100 and 600 mmHg, and the second stage of esterification is effected at a temperature falling between 200 and 240° C. and under a pressure falling between 100 and 550 mmHg.

10. Polybutylene terephthalate characterized in that its crystallization temperature in cooling falls between 170 and 180° C., that its solution haze is not larger than 20%, and that, when it is molded into shaped articles through injection molding, the spherical grains constituting the articles have a mean radius of not larger than 4 $\mu$m.

11. Polybutylene terephthalate as produced according to the method of claim 1 or 2 and characterized in that its crystallization temperature in cooling falls between 170 and 180° C., that its solution haze is not larger than 20%, and that, when it is molded into shaped articles through injection molding, the spherical grains constituting the articles have a mean radius of not larger than 4 $\mu$m.

12. A shaped article formed from polybutylene terephthalate of claim 10.

13. A shaped article formed from polybutylene terephthalate of claim 11.

* * * * *

UNITED STATES PATENT AND TRADEMARK OFFICE
CERTIFICATE OF CORRECTION

PATENT NO. : 6,060,579
DATED : May 9, 2000
INVENTOR(S) : Hiroyuki Ohme, Motoki Hiratsuka and Katsuo Nogami It is certified that error appears in the above-indentified patent and that said Letters Patent is hereby corrected as shown below:

Column 2, line 45, please change "0.05" to --0.08--.

Signed and Sealed this

Tenth Day of April, 2001

Attest:

NICHOLAS P. GODICI

Attesting Officer        Acting Director of the United States Patent and Trademark Office